United States Patent
Karagiannis et al.

(10) Patent No.: US 6,973,102 B2
(45) Date of Patent: Dec. 6, 2005

(54) JITTER REDUCTION IN DIFFERENTIATED SERVICES (DIFFSERV) NETWORKS

(75) Inventors: Georgios Karagiannis, Neede (NL); Vlora Rexhepi, Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 980 days.

(21) Appl. No.: 09/895,527

(22) Filed: Jun. 28, 2001

(65) Prior Publication Data

US 2002/0024974 A1    Feb. 28, 2002

Related U.S. Application Data

(60) Provisional application No. 60/221,928, filed on Jul. 31, 2000.

(51) Int. Cl.[7] .......................... H04J 3/06; H04L 12/28; H04L 12/56; G06F 13/00
(52) U.S. Cl. ........................ 370/516; 370/400; 709/238
(58) Field of Search ................................. 370/516, 238, 370/400; 709/242, 238

(56) References Cited

U.S. PATENT DOCUMENTS

| | | | |
|---|---|---|---|
| 5,649,108 A | 7/1997 | Spiegel et al. | 395/200.12 |
| 6,069,895 A | 5/2000 | Ayandeh | 370/399 |
| 6,078,963 A * | 6/2000 | Civantar et al. | 709/238 |
| 6,212,185 B1 | 4/2001 | Steeves et al. | 370/392 |
| 6,374,303 B1 * | 4/2002 | Armitage et al. | 709/242 |
| 6,466,985 B1 * | 10/2002 | Goyal et al. | 709/238 |
| 6,584,071 B1 * | 6/2003 | Kodialam et al. | 370/238 |
| 6,859,842 B1 * | 2/2005 | Nakamichi et al. | 709/238 |
| 2003/0053464 A1 * | 3/2003 | Chen et al. | 370/400 |

FOREIGN PATENT DOCUMENTS

| | | |
|---|---|---|
| EP | 0 892 575 A2 | 1/1999 |
| EP | 0 903 895 A2 | 3/1999 |
| EP | 1 051 003 A1 | 11/2000 |

OTHER PUBLICATIONS

Ferguson, P., Huston, G., "Quality of Service Delivering QoS on the Internet and in Corporate Networks", John Wiley and Sons, 1998.

(Continued)

*Primary Examiner*—Ricky Ngo
*Assistant Examiner*—Feben M Haile

(57) ABSTRACT

A method and a computer program for reducing jitter in IP packet transmission in a Diffserv network having ingress and egress Border Routers and using premium service, expedited forwarding and source route option, recognize incoming packets which have firm jitter requirements. The program verifies if a recognized packet has an entry in the forwarding cache for its IP destination address. If affirmative, the identified packet is sent to the next hop. If not, the program checks to see if a route table entry exists for the specified destination address. If affirmative, the route table entry is stored in the forwarding cache, and the packet is sent on its way. Otherwise, the program uses special filters to extract and select the shortest and fastest path to an egress border router to match the destination address; a list of selected router addresses is inserted as part of a source route option. All intermediate routers receiving a packet with the strict source route option set will forward the packet to the first address in the strict source option list. Subsequent packets which follow after the recognized packet and are bound to the same destination address will be sent in the same path as the identified first packet with the source route option turned off. The method ensures reduced jitter for packets having firm jitter requirements in a network using either static or dynamic routing. The invention also teaches a memory and an algorithm using the method.

37 Claims, 5 Drawing Sheets

Diffserv domain example

OTHER PUBLICATIONS

Jain R., "The art of computer systems performance analysis"John Wiley & Sons, 1991.

Labovitz, C., Ahuja, A., Jahanian, F., "Experimental Study of Internet Stability and Wide-Area Backbone Failures", Proceedings FTCS '99, Jun., 1999.

Misunas, D., "Voice over IP unite as technologies mature"located at http://www.itweb.co.za/office/micom/wpvoic.htm 2000.

"Internet protocol", RFC 791.

Postel J., "Internet Control Message Protocol", DARPA Internet Program Protocol Specification, Sep. 1981.

Baker, F., "Requirements for IP version 4 routers", RFC1812.

H. Schulzrinne, S., Casner, R. Frederick, V. Jacobson, "RTP: A Transport Protocol for Real-Time Applications", IETF REC1889, 1996.

Crawley E., Nair R, et al., "A Framework for QoS-based routing in the Internet", IETF RFC2386, 1998.

Blake, S., Black, D., Carlson, M., Davies, E., Wang, Zh., Weiss, W., "An architecture for Differentiated Services", IETF RFC2475, 1999.

Heinanen, J., Baker, F., Weiss, W., Wroclawski, J., "Assured Forwarding PHB group", IETF RFC2597, 1999.

Jacobson V., Nichols, K., Poduri, K., "An expedited forwarding PHB", IETF RFC2598, 1999.

Nichols, K., Jacobson, V., Zhang, L., "A two-bit Differentiated Services Architecture for the Internet", IETF RfC2638.

Awduche D., Malcomb, J., et al., "Requirements for Traffic Engineering Over MPLS", IETF RFC2702, 1999.

Stevens, W.R., "TCP/IP Illustrated, vol 1", Addison Wesley professional computing series, 1997.

http://www.cnaf.infn.it/~ferrari/tfng/ds/decides.ppt.

Tanenbaum., A.S., "Computer Networks", Prentice Hall, third international edition, 1996.

Veran, M., Serns, B., Potier, D., "QNAP2: A portable environment for queuing systems modelling", Modelling Techniques and Tools for Performance Analysis, D. Potier, pp. 25-63, 1985.

U. Black, "Voice OVER IP", Prentice Hall Series in Advance Technologies, 2000.

The IETFIP Performance Metrics (IPPM) WG, located at: http://www.ietf.org/html.charters/ippm-charter.html.

Deering, S., Hinden, R., "Internet Protocol, Version 6 (IPv6) Specification", IETF Rfc Standards Track, Dec. 1998.

PCT; Standard International Search Report for PCT/SE01/01692; Jan. 29, 2002.

* cited by examiner

Jitter versus number of routers

Diffserv domain example

JITTER REDUCTION IN DIFFERENTIATED SERVICES (DIFFSERV) NETWORKS

This claims priority from U.S. Provisional Application No. 60/221,928, titled, Jitter reduction in Differentiated Services (DiffServ) networks, and filed on Jul. 31, 2000, which is incorporated herein by reference.

FIELD OF THE INVENTION

This invention is applicable in the field of real time Internet Protocol (IP) applications that use the Differentiated Services (Diffserv) concept [RFC2475] to support various Quality of Service (QoS) requirements.

This application makes reference to published protocol documents and similar published references which include but are not limited to the following RFC publications: RFC 791, 792, 1812, 1889, 2386, 2475, 2597, 2598, 2638, and 2702. A complete listing of the references used in this text is provided at the end of the text.

DESCRIPTION OF PRIOR ART

Differentiated Services (Diffserv) architecture [RFC2638], [RFC2475] is a result of efforts to introduce a highly scalable scheme to provide QoS over IP networks. In Diffserv, Per-flow state is pushed to the edges and the traffic through Diffserv routers is treated on aggregate basis. The service differentiation is achieve by means of Differentiated Service (DS) field in the IP header and the Per-Hop Behavior (PHB) as main building blocks. At each node packets are handled according to the PHB invoked by the DS byte in the packet header. The PHB defines the externally observable behavior at the node. Two PHBs have been defined, the assure forwarding (AF-) PHB [RFC2597] and the expedited forwarding (EF-) PHB [RFC2598]. The Diffserv domain will provide to its customer, which is a host or another domain, the required service by complying fully with the agreed Service Level Agreement (SLA). SLA is a bilateral agreement between the boundary domains negotiated either statically or dynamically. The Diffserv domain will provide to its customer (a host or another domain) the required service by complying fully with the agreed SLAs. The SLA defines the forwarding service that the customer of the Diffserv domain will receive and, the Traffic Conditioning Agreement (TCA) which in twin specifies from one point of view, what the client of the Diffserv domain should do to achieve the desired service and from another point of view specifies what the Diffserv domain service provider will have to do to enforce the traffic limits, e.g., throughput, specified by the SLA. The service differentiation is achieved by means of Differentiated Services (DS) byte and Per-Hop Behavior (PHB) as main building blocks. At each router, packets are handled according to the PHB invoked by the DS byte in the packet header. Up to date there are two PHBs defined: the expedited forwarding type (EF-PHB) and the assured forwarding type (AF-PHB). The EF-PHB provides tools to build a low loss, low latency, low jitter and an assured bandwidth, end-to-end service through DS domains [RFC2598]. This service is also known as premium service [RFC2638]. The AF-PHB group consist of four PHB classes and it can be used to provide quality differentiation related to various quality aspects [RFC2597]. It is also known as assured service [RFC2638].

A preferred service for applications with strict QoS requirements is the premium service, i.e. Expedited forwarding PHB.

In Diffserv there are two types of routers defined, the border routers that interconnect the Diffserv domain to other Diffserv or non-Diffserv-capable domains, and intermediate routers that connect only to other Diffserv intermediate routers or border routers within the same domain. Both Diffserv border routers and intermediate routers must be able to apply the appropriate PHB to packets based on the Diffserv codepoint. A Diffserv border router can act as a Diffserv Ingress router or as a Diffserv Egress router.

A Diffserv Ingress border router is the entry router for incoming traffic and a Diffserv egress border router is the exit router of the outgoing traffic. The Diffserv Ingress router is responsible for ensuring that the incoming traffic is conforming to the agreements between the domain it belongs to and the domain to which it is connected. A Diffserv egress router may perform traffic conditioning functions on traffic forwarded to a directly connected peering domain, depending on the agreement between the two domains. It is to be noted that the terms ingress border router and egress border router used further in describing this invention are either routers connected to hosts, or to other border routers of other domains, respectively.

Routing in the current IP can be done either statically or dynamically. In static routing the routes to destinations are manually configured and network reachability to these destinations is independent of the current state in the network itself. It is a stable, but inflexible routing scheme due to the necessity of manual reconfiguration of the routes any time the topology changes. In dynamic routing the routes are configured via routing protocols, and network reachability is dependent on the current states of the network. It is a far more flexible scheme than static routing. In current Diffserv implementations static routing is used as the main scheme, and dynamic routing is used as an optional scheme where the choice of routes depends on the current load on the network.

Independent of the routing schemes, the IP packets will be routed based on fields in the IP header. The IP packets can always contain besides the standard fields one of the IP options including Security, Strict Source Route, Loose Source Route, Record Route or Timestamp.

The strict source route option gives a complete path that the IP packets should follow. Moreover, every router has to support source route options in forwarded packets. In some cases routers may discard the packets with the source route option set. Usually strict source route option is used by network administrators for managing the network, as an element of various network diagnostic tools.

The strict source route option in this proposal will be used as a tool in fulfilling the low jitter requirements of the applications with strict quality of service requirements. By means of the strict source route option the network administrator will specify a strict route that will be followed by all the subsequent packets generated by the same user application.

Jitter in Diffserv

In general, the applications that will have to be supported by the Diffserv domains will have widely varying traffic characteristics and service demands, on e.g., delay and jitter, varying from best effort applications, e.g., e-mail, to real time applications such as audio and video. Moreover, in several real time applications the variation in service characteristics can be also significant. For example, interactive audio applications have different service characteristics from interactive video applications. The main reason for this fact is related to the human perception for sound and moving images. The human ear is sensitive to sound variations that occur within a few milliseconds, whereas, the human eye can only notice light variations that occur after 60 milliseconds.

These different service characteristics will also impose different QoS requirements on the Diffserv network that supports such applications. Referring to the previous example, the QoS Requirement on the Diffserv domain will be the variation in the latency or delay to transport the data from an ingress border router to an egress border router. Usually this delay variation is called jitter. Jitter can be comprehended as the absolute value of the difference between arrival times of two adjacent packets, i.e., aj and ai, minus their departure times, i.e, dj, di, |(aj−dj)−(ai−di)|.

Expedited Forwarding Per Hop Behavior can be implemented in the Diffserv architecture, to provide a low loss, low jitter and an assured bandwidth, end to end service through Differentiated Services domains. In other words, the EF-PHB can assure that at every transit router, the aggregate's departure rate must equal or exceed a configurable rate, such that the aggregate's maximum arrival rate is less than the aggregate's minimum departure rate. However, this can not always guarantee that jitter will be controlled or limited. As an example, reference maybe had to the Diffserv experiments accomplished in the TF-TANT project (see [TF-TANT]), where the instantaneous packet delay variation for expedited forwarding packets through only two transit routers can get values as high as 10 milliseconds. It is to be noted that:

Jitter is equal to the absolute value of the packet delay variation (see [IPPMWG]).

The measured values are obtained when the transit differentiated service router has to support both expedited and best effort services. In these experiments additional assured forwarding (AF) traffic is not included. However, it is expected that in real situations the assured forwarding traffic will have a significant contribution.

Different Diffserv network parameters may have an impact on the end to end jitter performance in a Diffserv domain. These include for example:

The number of routers that a packet has to travel from an ingress border router to an egress border router. Note that on average, the absolute value of the jitter increases by increasing the number of routers.

The processing time of a packet. Note that by packet processing time is meant the sum of the time that a packet has to wait in the queue and the service time of this packet. On average, the packet processing time in a router with a fast CPU will be smaller than the packet processing time in a router with a slow CPU.

The jitter on each transit router that is located in the forwarding path of a packet from an ingress router to an egress router. Note that on average, the absolute value of the jitter in a router with a fast CPU will be smaller than the absolute value of the jitter in a router with a slow CPU.

The randomness in choosing the forwarding path of the packets that are belonging to one application session, e.g., one interactive audio application, Voice over IP [VoIP] between the calling user and the called user. Usually the randomness, or instability in Internet route changes, is caused if:

a router or link fails;

performance of a link degrades or improves;

a router cycles between different routes to the same destination in order to balance the load.

Experiments

In order to find out what impact the different Diffserv network parameters mentioned above have on the end to end jitter performance, three sets of simulation experiments were conducted. A simulation tool that is known as Queuing Network Analysis Packet (QNAP) [VeSe85] was used. To obtain independent replications, the so called method of independent replicas was used. Reference may be had in this context to "Art of computer systems performance analysis" by Jain R, published by John Wily and Sons, 1991 and to Jain 91.

In all these experiments, one type of traffic was studied, i.e., Expedited Forward. One Diffserv domain was used, similar to one depicted in FIG. 4, but in place of 7 routers, 30 routers were used. In the experiment, IP version 4 described in RFC791 was used, which has a maximum IP field of 9 hops. However, due to the fact that the IP option field is limited to only 9 hops, it was specified that the longest path from an ingress border router to an egress border router is a total of 9 hops (routers). Note that this Limitation does not apply when instead of IP version 4, the IP version 6 (RFC 2460) is used. In order to be able to control the processing time of a packet and the jitter at each router, each router was modeled by an infinite server which has service time distribution a normalized Gaussian (Normal) distribution. The normalization is necessary, since the Gaussian distribution can get negative values. The mean value of this distribution identifies the mean processing time of a packet and its standard deviation identifies the packet jitter introduced by a router.

It is to be noted that the jitter at each router can be caused by different parameters such as the best effort and the AF traffic in the Diffserv domain. Furthermore, it is also noted that the parameters (mean and standard deviation) of the normalized Gaussian distribution used to specify the packet processing time in each router are calculated at the beginning of each simulation run. Moreover, regarding the used forwarding path, two scenarios were distinguished.

In the first scenario (scenario 1) a percentage of the total packets sent from an ingress border router to an egress border router and independent of the application session that they belong to, can be forwarded hop by hop in a random way that is following a Uniform distribution. This percentage of the total packets that follow a random forwarding path identifies the instability in Internet route changes. It is noted that each router is used only once in the forwarding path.

In the second scenario (scenario 2), all packets belonging to one session will follow one predefined forwarding path from an ingress router to an egress router. As in scenario 1, each router is used only once in the forwarding path.

It is to be noted that in each experiment, the results were average over 100 statistical independent sessions. Due to the fact that queues with infinite servers were used, the used workload will not influence the obtained jitter results. However, it should be noted that the used workload sent through one ingress border router, is 10 packets per second and has a Poissonian distribution.

The obtained 95% confidence intervals are smaller than ±1% of the calculated mean results.

First Experiment Set

In this set the impact of the instability in Internet route changes on the end to end jitter performance in a Diffserv network was investigated. In this set of experiments both experimental scenarios explained in the subheading "Experiments" above were used. In particular, for a percentage of instability routes of 0%, scenario 2 was used. In all other situations scenario 1 was used. The length of the forwarding path is nine routers. The parameters (mean and standard deviation) of the normalized Gaussian distribution used to specify the packet processing times in each router are calculated as follows. For each router the mean value can be in the range from 5 to 20 milliseconds and the standard deviation can have a value in the range of 5% of the mean to 20% of the mean. The probability used to obtain a value from the given ranges has a uniform distribution. FIG. 1 depicts the results obtained in this experimental set. As seen from FIG. 1, Jitter seems to increase somewhat linearly with an increasing percentage of unstable routes used from the total routes available. From this figure it is seen that by increasing the percentage of instability in the Internet routes from 0% to 100%, the mean jitter increases by approximately 100%.

From this experiment set it can be concluded that the percentage of instability in Internet route changes should be kept as small as possible. Static routing can always fulfill this requirement. Regarding dynamic routing, it has been shown in various papers, that the instability in Internet routes within the region of one Internet Service Provider (ISP) is very small, since no daily or weekly instability frequency components could be observed.

Second Experiment Set

In this set of experiments the impact of the router CPU processing speed on the end to end jitter performance was studied. In this set of experiments scenario 2 was used. However, depending on the packet processing speed on each router, two types of experiments were performed. The CPU processing times of the routers used in the first type of experiments, specified as SLOW, are in average 4 times slower than the CPU processing times of the routers used in the second type of experiments, specified as FAST. In particular, in the "SLOW" experiments, for each router the mean value can be in the range from 20 to 80 milliseconds and the standard deviation can have a value in the range from 5% of the mean to 20% of the mean. In the "FAST" experiments, for each router the mean can have a value in the range from 5 to 20 milliseconds and the standard deviation can get a value in the range from 5% of the mean to 20% of the mean. The length of the forwarding path is varied from 1 to 9 routers.

From the results depicted in FIG. 2 it can be deduced that by increasing the CPU processing speed from 1 to 4 times on average, the mean jitter increases approximately 4 times. It is seen from FIG. 2 that Jitter increases generally with an increasing number of slow routes are compared with fast routes out of the total used routes. By increasing the length of the forwarding path, the end to end mean jitter increases almost linearly.

From these experiments it can be concluded that in order to reduce the end to end mean jitter significantly, it is desirable to choose the fastest and the shortest forwarding path.

Third Experiment Set

In this set of experiments the impact of the jitter generated by one router on the end to end jitter performance was studied, and scenario 2 was used. Depending on the produced jitter on each router, two types of experiments were performed. The jitter on each router was generated and varied by changing the standard deviation of the normalized Gaussian distribution that is applied to model the router service time distribution. Two types of experiments were performed. In both types of experiments, and for each router the mean value can get in the range from 5 to 20 milliseconds. In the first type of experiments, specified as "LOW JITTER", the jitter generated by each router is on an average 2 times lower than the jitter generated by each router in the second type of experiments, specified as "HIGH JITTER", In particular, in the "LOW JITTER" experiments, for each router the standard deviation can have a value in the range from 5% of the mean to 12.5% of the mean. In the "HIGH JITTER" experiments, for each router the standard deviation can have a value in the range from 5% of the mean to 20% of the mean. The length of the forwarding path is varied from 1 to 9 routers.

FIG. 3 generally shows the correlation between end to end mean jitter and the number of routers having different degrees of jitter. From the results depicted in FIG. 3, it can be deduced that by increasing the jitter on the routers 100% on average, the end to end mean jitter increases approximately 30%. By increasing the length of the forwarding path, the end to end mean jitter is increasing almost linearly.

From these experiments it can be concluded that in order to reduce the end to end mean jitter significantly, the shortest forwarding path that includes routers that generate very small jitter have to be chosen. In general, the routers that create the smallest jitter are also the fastest routers.

PRIOR ART SOLUTIONS

In general, several solutions have been presented to solve the jitter problem at the application or the network level.

Solution_1 attempts to solve the jitter problem at the application level, i.e., only at the communication end points, by using a synchronization buffer. Jitter is removed by correlating actual arrival time differences with the corresponding sender time differences. This solution can be achieved through the time stamps used in the Real time Transport Protocol (RTP). See RFC (1889).

The following additional solutions are known to be used to solve jitter at only the network level.

Solution_2: this mechanism is widely used to control jitter in a network (see e.g., [Tan96]). Before sending the packets through the network, each router will have to compute the expected transit time. At the time that a packet arrives at a router, the router will check if the packet is behind or ahead the scheduled expected transit time. This information is stored in the packet and is updated at each hop. The next hop that receives the packet will check this stored information and if the packet is ahead of the predefined schedule, it will hold the packet long enough to get it back on schedule. In a situation where the packet is behind its schedule, the router will give it a high priority such that it will be sent as fast as possible to the output.

Solution_3: this solution is used in a Diffserv domain, where the incoming traffic through one ingress border router is shaped according to a predefined Traffic Conditioning Agreement (TCA) (see [RFC2475]).

By providing suitable traffic shaping, the amount, volume and rate of the traffic, and thus also the jitter, sent into the Diffserv domain can be controlled.

Solution_4: this solution is described in [RFC2386], where an architecture, called QoS-routing, has been specified to provide dynamic routing by using QoS requirements. The QoS requirements, e.g.,jitter are used during the routing process.

In this way an optimal route (or path) with a minimum end to end jitter can be found.

Solution_5: this solution called Multiprotocol Label Switching (MPLS), and similar to Solution_4 is able to use QoS requirements during the dynamic routing process.

PROBLEMS WITH KNOWN SOLUTIONS

Solution_1: this solution can only be used at the application level. Therefore, if the jitter in a network becomes large, i.e., in a large network such as one that supports a Diffserv architecture, this solution will not be able to reduce the end to end jitter satisfactorily.

Solution_2: Due to its complexity, if the router should implement a complex packet scheduling and buffering mechanism, it will not be able to satisfy the Diffserv scalability requirements (see [RFC2475]);

Solution_3: The disadvantage of this mechanism regarding jitter control, is that it is only solving the jitter problem at the Diffserv domain border routers, and not into the Diffserv domain intermediate routers. The measurements accomplished in the TF-TANT project (see Section 3.2) show that this mechanism does not completely satisfy the low EF low jitter requirements.

Solution_4: This architecture has been specific by an Internet Engineering Task Force (IETF) Working Group (WG) called QoS routing WG. This WG has studied this architecture and it has found that is quite complex to be implemented and provided as a general QoS routing solution.

Solution_5: This solution is specified in the MPLS IETF WG and is the most promising. However, this architecture remains complex and the IETF will have to address several issues (see e.g., [RFC2702]), before its future can be decided.

A need still exists for a method of efficiently reducing jitter in Diffserv networks in the context of an access or core network, regardless of whether static or dynamic routing is used.

SUMMARY OF THE INVENTION

The present invention offers a method/algorithm for reducing jitter and can be viewed as an entirely new solution in the area of Diffserv networks.

This method/algorithm can be applied in any Diffserv domain, in an access or core network, regardless of which routing mechanism is used, i.e., static or dynamic routing.

The invention in its broad form resides in a method of reducing jitter in an Internet Protocol (IP) packet transmission in a network which uses a strict source route option, a forwarding cache and IP destination address for user data packets, the network having at least one ingress border router and an egress border router and an intermediate router said method comprising the operational steps in the ingress border router, intermediate routers and egress border router generally as in FIG. 5.

In A Preferred Embodiment, The Following Operational Steps Are Included:

Operation steps in the ingress border router:

Step_A1: the ingress border router, based on the Traffic Conditioning Agreement (TCA) recognizes the EF packets with firm jitter requirements. This operation is similar to what is specified in [RFC2475]. Additionally, this ingress border router should contain and maintain a list with the shortest and the fastest forwarding paths to each egress border router. This information has to be stored and managed by the Diffserv domain provider. Each time that the ingress border router classifies an EF packet and it has no forwarding cache entry for its IP destination address, (i.e., the first sent packet of a certain application running on a host,) it then extracts by using special filters configured in the ingress border router, the shortest and fastest path to an egress border router that is best matching the IP packet destination address. If the ingress border router has an entry for its IP destination address then Step_A4 should be followed.

Step_A2) in the strict source route option it inserts a list of router addresses that identify the selected path found in Step_A1.

Step_A3) the next hop IP address for this particular IP destination address will be stored in its forwarding cache.

Step_A4) all subsequent packets to the same IP destination address will be forwarded to the next hop IP address stored in its forwarding cache. Step_A1, Step_A2 and Sstep_A3 do not apply for these packets.

Step_A5) Depending on the size of the forwarding caches and on the types of applications that the Diffserv domain will support, e.g., VoIP, the Diffserv Domain operator will have to define a time period, say T_update, that will be used for updating the selected path. In other words, the router will repeat the steps Step_A2, Step_A3 and Step_A4 each T_update may be set to 60 seconds. Note that the mean duration time of a Public Switched Telephony Network (PSTN) varies from 120 to 180 seconds. Moreover, the activation of the updated time period, T_update, is set by the ingress border router at its start up. Therefore, each T_update period all EF packets with firm jitter requirements, that can be characterized as being of the same application type, will be sent by the ingress border router using the strict source route option and inserting a list of router addresses that identify the selected paths found.

The operational steps explained above are illustrated in FIG. 5.

The Optional Operation Steps in the Interior Routers in a Preferred Embodiment Include:

Step_B1: All intermediate routers that receive a packet with the strict source route option set will forward this packet to the first router address in the strict source route option list, which is the net hop for this packet. The next hop address will remain in the routers forwarding cache table.

Step_B2: All the subsequent packets that have the same IP destination address will also follow the same path that the first packet has followed. Note that all these subsequent packets will have the strict source route option turned OFF.

Operation Step in the Egress Border Router:

Step_C1: When the router receives a packet in which this list is completed, i.e., the egress border router, than the packet has reached its destination.

A modification of the inventive method includes the step of maintaining a list of the shortest and fastest forwarding paths which are configured by each border router.

A variation of the invention includes the step of selectively updating the selected shortest and fastest forwarding paths within a predetermined time period.

A further variation of the invention includes the step of choosing the predetermined time period based on the forwarding cache size and types of applications which the network will support.

The invention also includes a software program and a programmed memory to execute the above method.

The invention in another form resides in a method of reducing jitter in Internet Protocol (IP) packet transmission in a Differentiated Service Architecture (Diffserv) network with assured packet forwarding, said Diffserv using a forwarding cache and IP destination addresses for packets, and an on demand or traffic driven route cache population, the network having at least an ingress border router and an egress border router, comprising the steps of:

actuating an IP forwarding optional parameter using a source route option;

receiving a packet which has a specified IP designation address;

checking the forwarding cache if an entry is available for the IP destination address;

if affirmative, sending a received packet to next hop specified by the forwarding cache entry;

if there is no entry in the forwarding cache, then, checking if a route table entry exists for the specified destination address;

if there is a route table entry, then, storing the route table entry into the forwarding cache, and sending the packet on its way;

if there is no forwarding cache entry for the IP destination address, then selecting and extracting using filters the shortest and fastest path to an egress border router;

inserting in the source route option a list of the router addresses that identify the selected path;

storing in the forwarding cache a next hop IP address for the IP destination address;

sending the received packet via the selected path; and handling following packets which follow the received packet and are bound to the same destination address by routing them to follow the received packet.

In a modification, the Diffserv network includes a strict source route option and intermediate routers which receive a further packet with the strict route option set, the method including the step of forwarding further packet to a first router address in the strict source route option list which is the next hop for said further packet.

The invention also consists in a method of reducing jitter in an Internet Protocol (IP) transmission in a Differentiated Service Architecture (Diffserv) network which handles information packets with expedited forwarding (EF), said network using a forwarding cache, a strict source route option, at least one ingress border router and one egress border router, and a Diffserv domain provider, said method comprising the steps of:

a. recognizing EF packets which have firm jitter requirements;

b. storing and maintaining in the ingress border router using the Diffserv domain provider a list of the shortest and fastest forwarding paths from the ingress border router to each egress border router;

c. ascertaining if a received EF packet has no entry for its IP destination address, and if affirmative;

d. extracting using special filters configured in the ingress border router, path-information regarding a selected path representing the shortest and fastest path to an egress border router that best matches the IP destination address of the EF packet;

e. inserting in the strict source option, a list of router addresses which identify the selected path in step (d);

f. storing in the forwarding cache a next hop IP address for the particular IP destination address; and g. forwarding subsequent IP packets subsequent to said EF packets to said next hop IP address.

A modification includes the step of defining a time period T_update which is used for updating the selected path of step d as above.

Preferably, the time period T_update is approximately 60 seconds, depending on the application. In an embodiment, the time period T_update is used in a Voice Over IP (VoIP) application.

The time period T_update could be used in a Public Switched Telephony network (PSTN), where preferably, T_update is in the range of 120 to 180 seconds.

Advantageously, the method might include the step of setting up activation of the time period T_update at start up time of an ingress border router.

The invention also resides in a computer program/memory for reducing jitter in an Internet Protocol (IP) packet transmission in a Differentiated Service Architecture (Diffserv) network with assured packet forwarding, said Diffserv using a forwarding cache and IP destination addresses for packets, and an on demand or traffic driven route cache population, the network having at least an ingress border router and an egress border router, the program/memory using a method comprising the steps of:

actuating an IP forwarding optional parameter receiving a packet which has a specified IP destination address;

checking the forwarding cache if an entry is available for the IP destination address;

if affirmative, sending a received packet to a next hop specified by the forwarding cache entry;

if there is no entry in the forwarding cache, then, checking if a route table entry exists for the specified destination address;

if there is a route table entry, then, storing the route table entry into the forwarding cache, and sending the packet on its way.

The invention also resides in a computer program and a memory for reducing jitter in an Internet Protocol (IP) transmission in a Differentiated Service Architecture (Diffserv) network which handles information packets with expedited forwarding (EF), said network using a forwarding cache, a strict source route option, at least one ingress border router and one egress border router, and a Diffserv domain provider, said program/memory using a method comprising the steps of:

a. recognizing EF packets which have firm jitter requirements;

b. storing and maintaining in the ingress border router using the Diffserv domain provider a list of the shortest and fastest forwarding paths from the ingress border router to each egress border router;

c. ascertaining if a received EF packet has no entry for its IP destination address, and if affirmative;

d. extracting using special filters configured in the ingress border router path-information regarding a selected path representing the shortest and fastest path to an egress border router that best matches the IP destination address of the EF packet;

e. inserting in the strict source option, a list of router addresses which identify the selected path in step (d);

BRIEF DESCRIPTION OF THE DRAWING

A more detailed understanding of the invention may be had from the following description of preferred embodiments, given by way of example only, and to be understood in conjunction with the accompanying drawing wherein.

DETAILED DESCRIPTION

Figure 1:
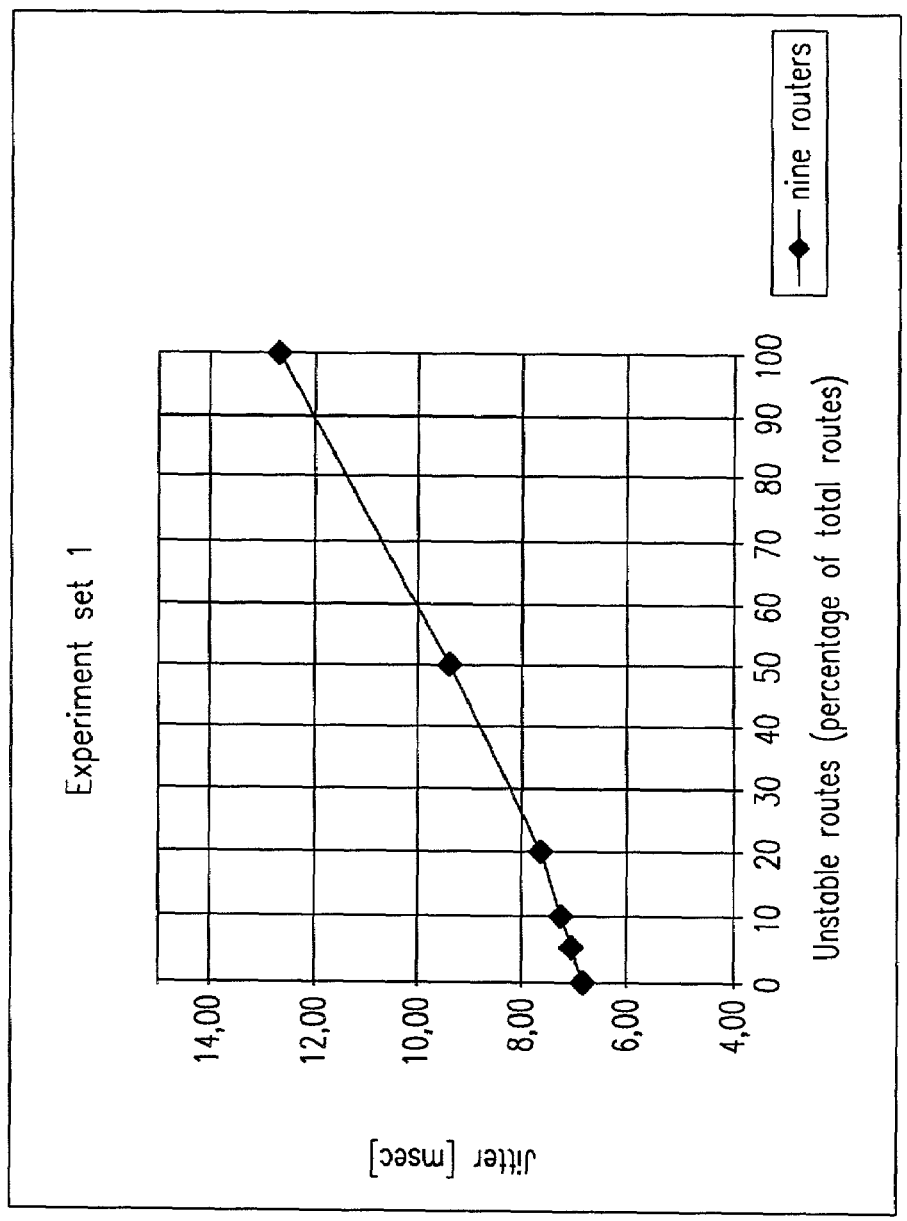
FIG. 1 is an illustration of the variation of jitter in microseconds, with the percentage of routes which are unstable.
Figure 2:
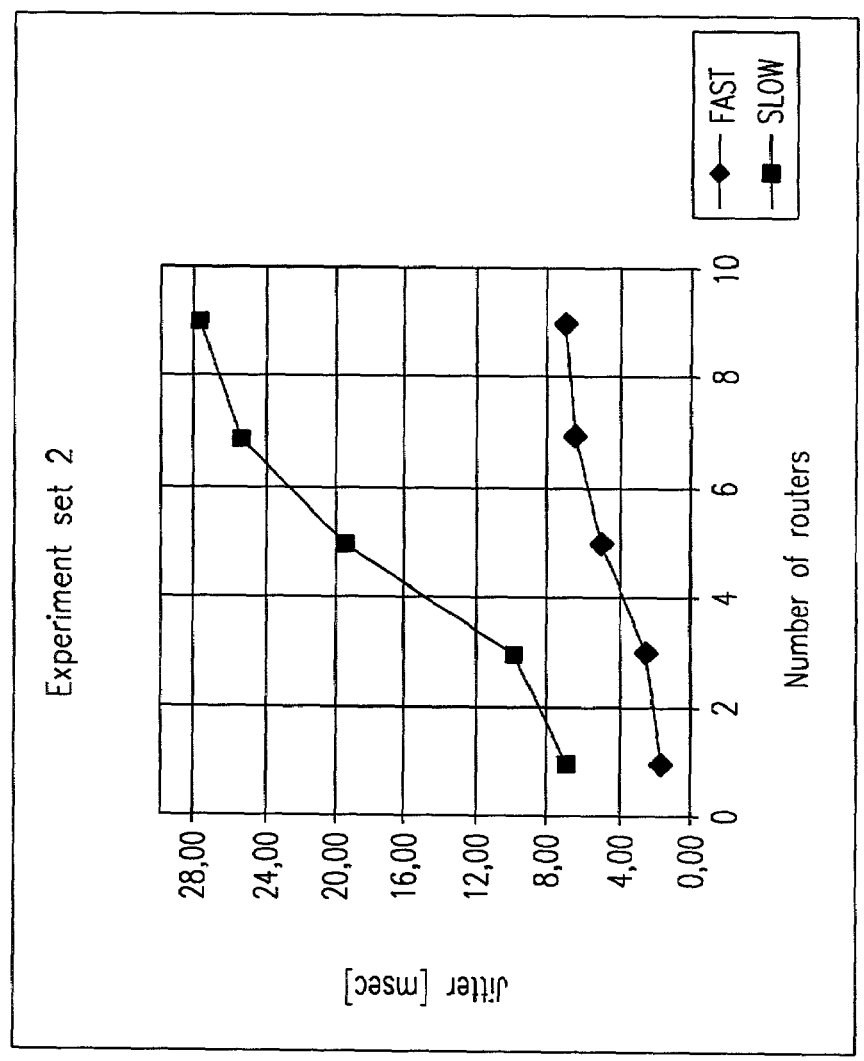
FIG. 2 is an illustration of how jitter varies with the number of fast and slow routers.
Figure 3:
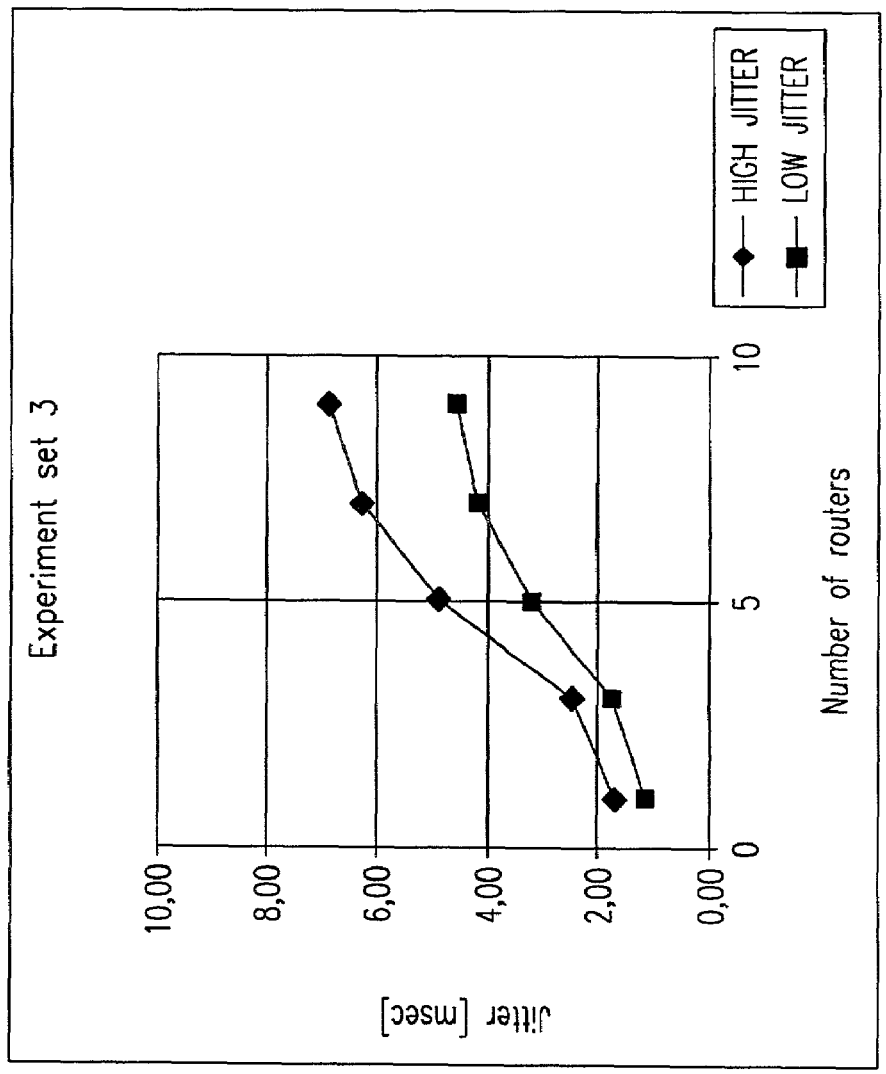
FIG. 3 is an illustration of the variation of jitter (in microseconds) with the number of known high jitter and low jitter routes.

Described hereinafter is a method/algorithm/memory for limiting jitter in an IP transmission. The following description is intended to be understood in light of jitter reduction in IP transmission in a Diffserv network.

Listed below are preferred requirements to be generally satisfied in order to apply the invention:

Requirement_1: In each router, Diffserv domain border and intermediate, the possibility of packet forwarding has to be supported. In most router implementations, this can be achieved by using a forwarding cache and by activating (setting to ON) the optional parameter "ip_forwarding" that is used in the operation system kernel of each router (see [Stev97]). The "ip_forwarding" option (see [Stev97]) is applied to ensure that the IP packets passing a router will be forwarded.

It is to be noted that the packet forwarding process is usually referred to as on-demand or traffic-driven route cache population and it works in the following way (see [FeHu98]). When a router receives a packet, it checks the forwarding cache to find out if an entry for the IP destination address specified in the packet is available. If that is the case then the packet is sent to the next hop specified by the forwarding cache entry. When no entry exists in the forwarding cache then the router will check if a route table entry exists for the specified IP destination address. If the route table has an entry then this entry is stored into the forwarding cache and the packet is sent on its way. Otherwise the router sends an Internet Control Message Protocol (ICMP) [RFC792] unreachable message to the sender and the packet is discarded.

Requirement_2: the ingress border router, based on the Traffic Conditioning Agreement (TCA) recognizes the EF packets with firm jitter requirements. Additionally, this router should contain and maintain a list with the shortest and the fastest forwarding paths to each egress border router. This information has to be stored and managed by the Diffserv domain provider. Each time that the ingress router classifies an EF packet (i.e., the first sent packet of a certain application running on a host) and it has no entry for its IP destination address, then it will have to follow the steps listed below:

Step_1): by means of special filters configured in the router it extracts the shortest and fastest path to an egress border router that is best matching the IP packet destination address.

Step_2) inserts a list of router addresses that identify the selected path found in Step_1 in the strict source route option.

Step_3) the next hop IP address for this particular IP destination address will be stored in its forwarding cache.

Step_4) all subsequent packets to the same IP destination address will be forwarded to the next hop IP address stored in its forwarding cache. Step_1, Step_2 and Step_3 do not apply for these subsequent packets.

Requirement_3: All intermediate routers that receive a packet with the strict source route option set will forward this packet to the first router address in the strict source route option list, which is the next hop for this packet. The next hop address will remain in the routers forwarding cache table. All the subsequent packets that have the same IP destination address will also follow the same path that the first packet has followed. It is to be noted that all these subsequent packets will have the strict source route option turned OFF.

When the egress border router receives a packet in which this list is completed, then the packet has reached its destination.

Requirement_4: Depending on the size of the forwarding caches and on the types of applications that the Diffserv domain will support, e.g., VoIP, the Diffserv Domain operator will have to define a time period, say T_update, that will be used for updating the selected path. In other words, the router will repeat the steps Step_2, Step_3, and Step_4 listed in Requirement_2 each T_update time. For a VoIP application, T_update may be set to 60 seconds. It is noted that the mean duration time of a Public Switched Telephony Network (PSTN) varies from 120 to 180 seconds. Moreover, the activation of the updated time period, T_update, is set by the ingress border router at its start up. Therefore, for each T_update period, all EF packets with firm jitter requirements that can be characterized as being of the same application type, will be sent by the ingress border router using the strict source route option and inserting a list of router addresses that identify the selected paths found.

All intermediate routers, will operate as described in Requirement_3.

Operation

Considering that the requirements listed above are fulfilled, the algorithm of this invention will be able to operate in any Diffserv domain. This means that it will be able to operate in Diffserv domain used as an access network or in Diffserv domain used as core network (see [RFC2475]), independently of which routing mechanism is used, i.e., static or dynamic routing. The algorithm operates as follows.

Suppose that mixed traffic, e.g., EF, AF and best effort package, is sent to the Diffserv domain under study. The ingress border router of this domain will recognize the EF packets with specific jitter requirements, classify and process them as specified in [RFC2475] and in the Requirement_2 described earlier.

In other words, using the Traffic Conditioning Agreement (TCA) to recognize the EF packets with firm jitter requirements (see [RFC2475]), if the ingress router after classifying the EF packet (which may be a first sent packet of a certain application running on a host) could not find an entry for its IP destination address, then the router will have to follow the steps listed below:

Step_1): by means of special filters configured in the router it extracts the shortest and fastest path to an egress border router that is best matching the IP packet destination address.

Step_2) in the strict source route option it inserts a list of router addresses that identify the selected path found in Step_1.

Step_3) the next hop IP address for this particular IP destination address will be stored in its forwarding cache.

All subsequent packets that have to be sent to the same IP destination address will be forwarded to the next hop IP address stored in its forwarding cache. Step_1, Step_2 and Step_3 do not apply for these subsequent packets.

All the intermediate routers that receive a packet with the strict source route option set will forward this packet to the first router address in the strict source route option list, which is the next hop for this packet. The next hop address will remain in the routers forwarding cache table. Thus the following packets to the same destination will also follow the same path that the first packet has followed. When the router receives a packet in which this list is completed then the packet has reached its destination. The routers used for this purpose in the Diffserv domain are enabled to specify the source route by means of special filters implemented in the routers [RFC1812]. Each T_update seconds, e.g., 60 seconds, the operation steps described above will be repeated.

FIRST EXAMPLE

Figure 4:
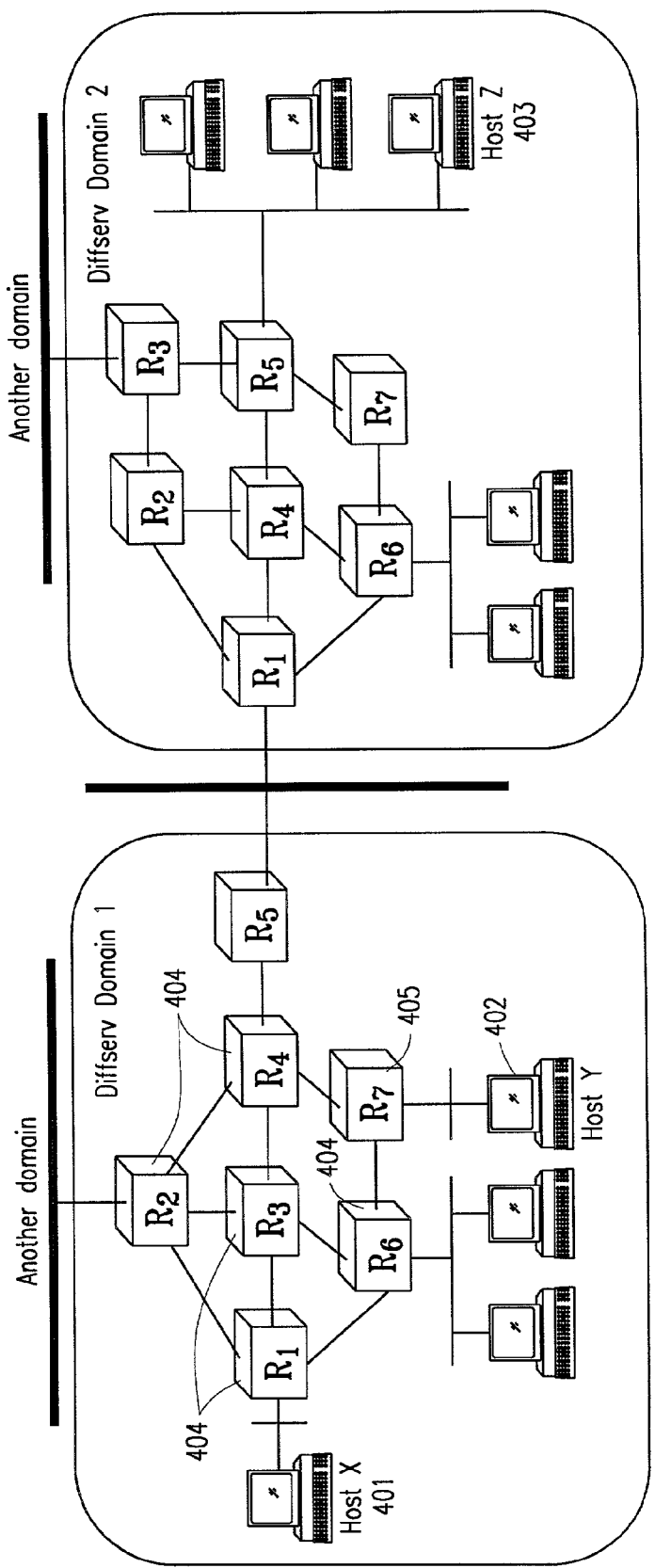
FIG. 4 is a Diffserv domain example incorporating the invention.

FIG. 4 generally shows a Diffserv domain example where the present invention can be applied in this example (see FIG. 4) the operation of the algorithm in the Diffserv Domain 1 is illustrated. This domain is used as an access network. Host X 401, Host Y 402, and Host Z403 are hosts which among other traffic, can support EF QoS aware applications with firm jitter requirements. Router {R1, R2, ... R6} are Diffserv routers.

Host X sends EF data traffic with firm jitter requirements to Host Y via router R1. In this example R1 is an ingress border router and the router R7 405, is an egress border router. The router R1 will apply the Requirement_2 explained earlier. In other words, it recognizes the first sent packet as an EF packet with firm jitter requirements, and by means of special filters and in the strict source route option, it inserts a list of router addresses that the packet sent to Host Y should follow. Note that the Diffserv domain provider has predefined this list. For example this list could be routers R3, R4 and R7. In this case Strict Source Route option will look like this:

R1 Strict Source Route option: IPaddrR3, IPaddrR4, IPaddrR7 Furthermore R1 will create an entry for the IP destination address in its forwarding cache.

Routers R3 and R4 will store in their forwarding caches the next hop address from the strict source option list when this packet traverses them.

When the packet arrives at router R7, the pointer will point to the destination address, i.e. the address of Host Y, which means that it has reached it final destination. This entry will be stored by R7 in its forwarding cache.

All subsequent packets that the host X sends to host Y will be sent by the router R1 as normal Diffserv packets, i.e., without activating the strict source route option. Due to the fact that the routers R1, R3, R4 and R7 will have an entry in their forwarding caches for the IP destination address of host Y, all subsequent packets that are sent to host Y will follow the same path as the path followed by the first EF packet that was sent by the Host X to host Y. Each T_update seconds, e.g., 60 seconds, the operation steps described above will be repeated.

SECOND EXAMPLE

The solution provided for the first example described in the previous Section, is a single Diffserv domain solution.

In the event that hosts are residing in different Diffserv domains (see FIG. 4) and e.g., Host X sends EF packets with firm jitter requirements to Host Z, then the following actions have to be accomplished.

In this example and for the Diffserv domain 1 the router R1 is an ingress border router and the router R5 is an egress border router. For the Diffserv domain 2 the router R1 is an ingress border router and the router R5 is an egress border router.

The operation of the algorithm for the packets that are traversing the Diffserv domain 1 will be similar to the operation of the algorithm explained in the first example. The only difference is that the egress border router of this domain is router R5 and not R7. Furthermore, the predefined list will be R3, R4 and R5.

When the first packet sent from host X to host Z traverses the Diffserv domain 1 and it arrives at the ingress router R1 of the Diffserv domain 2, then it will apply the Requirement_2 explained earlier. In other words, it recognizes the first sent packet as an EF packet with firm jitter requirements and by means of special filters and in the strict source route option it inserts a list of router addresses that the packet sent to Host Z should follow. Note that the Diffserv domain provider has also predefined this list. For example this list could be: router R4 and R5. In this case Strict Source Route option will look as follows:

RI Strict Source Route option: IpaddrR4, IpaddrR5

Furthermore R1 will create an entry for the IP destination address in its forwarding cache.

Router 4 will store in its forwarding cache the next hop address from the strict source option list when this packet traverses it.

When the packet arrives at router R5, the pointer will point to the destination address, i.e. the address of Host Z, which means that it has reached its final destination. This entry will be stored by R5 in its forwarding cache.

All subsequent packets that the host X sends to host Z will be sent by all router in both Diffserv domains as normal Diffserv packets, i.e., without activating the strict source route option. Due to the fact that all the selected routers will have an entry in their forwarding caches for the IP destination address of host Z, all subsequent packets that are sent to host Z will follow the same path as the path followed by the first EF packet that was sent by the Host X to host Z.

Each T_update seconds, e.g., 60 seconds, the operation steps described above will be repeated.

A significant advantage introduced by this invention is related to the fact that the Diffserv domain that implements this idea will be able to reduce the jitter in real time Premium Services, e.g., voice, without increasing significantly the complexity in the Diffserv domain router.

Figure 5:
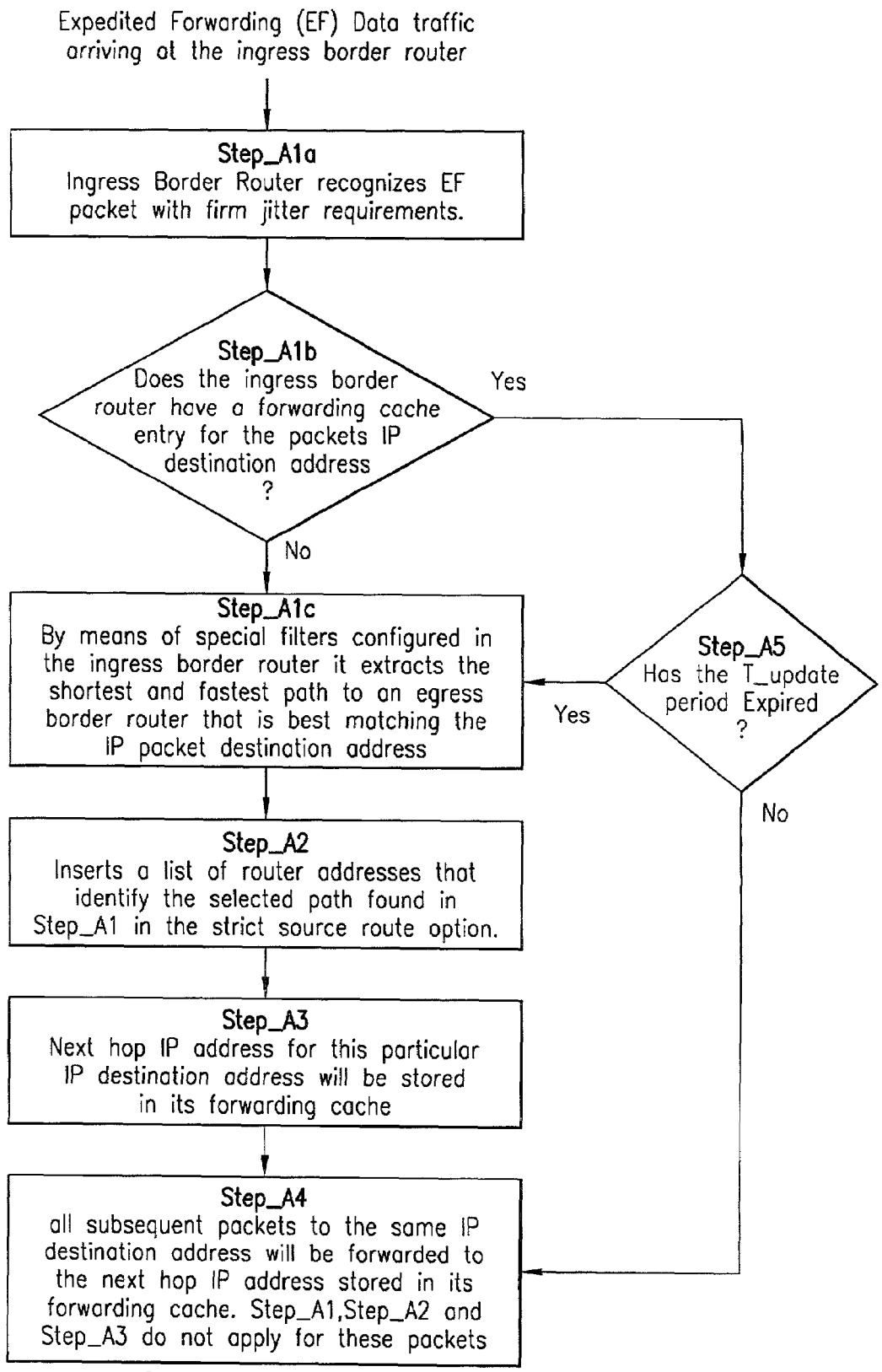
FIG. 5 is a flow diagram illustrating the steps for handling data packets in the ingress border router, using the invention.

FIG. 5 is a flow diagram for handling Expedited Forwarding (EF) data traffic which arrives at the ingress border router. In step A1a, them is recognition of an EF packet with firm jitter requirements. In step A1b a determination is made whether the ingress border router has a forwarding cache entry for the IP packet destination address. If affirmative, the process leads to step A5 which finds out if the T_update period has expired. If A5 is negative, the process proceeds to step A4. If A1b is negative, the shortest and fastest path to an egress border router which is best matching with the IP packet destination address is extracted by using special filters in step A1c. Following this, in step A2, a list of router addresses is inserted to identify the selected path found in step A1c in the strict source route option. In step A3, the next hop IP address for the particular destination address is stored in its forwarding cache. In the final step A4, all subsequent packets to the same IP destination address are forwarded to the next hop IP address stored in its forwarding cache. Steps A1, A2 and A3 do not apply for these packets.

The foregoing is a description of the inventive method which offers jitter reduction in a data network by recognizing data packets with firm jitter requirements and forwarding them by the fastest and shortest paths based on the IP destination address of the packet. An ingress border router or edge node which recognizes a packet with firm jitter requirements, if there is no forwarding cache entry of the destination address, will find and insert a list of router addresses satisfying the shortest and fastest path in the strict source IP routing option. All intermediate routers receiving a packet with the strict source routing option will forward the packets to the next hop specified in the strict source route IP option. The next hop address will remain in the routers forwarding cache table. Subsequent packets which have the same IP destination address will follow the same path which the first packet followed; the subsequent packets have the strict source option turned off.

EQUIVALENTS

The invention can be applied in all types of IP Autonomous Systems giving the possibility to a router to fix a specific predefined route and use it to send subsequent packets, without activating the strict source routing IP option, to the same destination. Note that an Autonomous System can be defined as a network wherein the used routing algorithms can operate independently of the routing algorithms applied in different networks.

Although preferred embodiments of the method and apparatus of the present invention have been illustrated in the accompanying drawings and described in the foregoing detailed description, it will be understood that the invention is not limited to the embodiments disclosed, but is capable of numerous rearrangements, modifications, equivalents and substitutions without departing from the scope of the invention as set forth in the appended claims.

What is claimed is:

1. A method for providing jitter reduction in a data network that uses a Strict Source route option, including an internet protocol (IP) destination address for information packets, the data network having ingress Border Routers (Edge Nodes), egress Border Routers and at least one intermediate router, the method comprising the steps of:
   each ingress Border Router (or Edge Node) recognizing data packets with firm jitter requirements and forwarding them to certain fastest and shortest paths based on the IP destination address of each data packet;
   enabling the ingress Border Router (or Edge Node)which classifies a data packet with firm jitter requirements for the IP destination address of which it has no entry, to insert a list of router addresses that identify the selected shortest and fastest path in the Strict Source Routing IP option;
   using all intermediate routers which receive a data packet with the Strict Source Routing IP option for forwarding the packet to a next hop address specified in the IP option, the next hop address remaining in a forwarding cache table of the routers;
   routing all subsequent packets that have the same IP destination address to follow the same path that the first packet has followed, while ensuring that all said subsequent packets will have their strict source route option turned off; and
   periodically updating the selected shortest and fastest path.

2. A method according to claim 1 including the step wherein a domain administrator will maintain a list with the shortest and the fastest forwarding paths, which will be configured in each Border Router (or Edge Node).

3. A method according to claim 2 including the step of the domain administrator defining a time period for updating the selected shortest and fastest path.

4. A method according to claim 1 including the step of an administrator of the network domain choosing a duration of the time period, depending on a size of the forwarding caches in the routers and on the types of applications that the network domain will support.

5. A method according to claim 3, including the step wherein the ingress Border Router (or Edge Node) extracts the shortest and fastest path to the egress Border Router from said list by means of special filters configured in the ingress Border Router, which perform the best matching on the IP packet destination address.

6. A method according to claim 5 including the step wherein the ingress Border Router (or Edge Node) inserts the path it selected into the Strict Source Routing IP option only in those data packets for which it has no information in the forwarding cache during said defined time period.

7. A method according to claim 1 including the step wherein all the intermediate routers receiving a data packet with the Strict Source routing option set will store at next hop into their forwarding cache, an entry, which will be used for the subsequent data packets that will be forwarded based on the matching of the destination IP address with the entry in the forwarding cache by means of said special filters.

8. A method according to claim 1 wherein said data network comprises a Diffserv Services (Diffserv) domain and wherein the Diffserv domain operates in accordance with any version of the IP (Internet Protocol).

9. A Border Router (or Edge Node) that operates using the method of claim 1.

10. A Core Router (or Interior Node) that operates using the method of claim 1.

11. A Differentiated Services (Diffserv) domain operating using the Border Router of claim 9.

12. A Differentiated Services (Diffserv) domain operating using the Core Router of claim 10.

13. A method for reducing jitter in an Internet Protocol packet transmission in a network which uses a strict source route option, a forwarding cache and internet protocol (IP) destination address for information packets, the network having at least one ingress Border Router and an egress Border Router and an Intermediate Router, said method comprising the steps of:
   an ingress Border Router receiving and recognizing information packets with firm jitter requirements;
   the ingress Border Router containing and maintaining a list of shortest and fastest forwarding paths to each egress Border Router, said list being stored and managed by a network domain provider;
   checking to see if a recognized packet has a forwarding cache entry for its destination address, and if negative, causing the ingress Border Router to use special filters to extract a selected shortest and fastest path to an egress Border Router which best matches the IP packet destination address;

if the ingress Border Router has an entry for its IP destination address, then forwarding all subsequent packets with the same destination address to a next hop address stored in its forwarding cache;

inserting in the Strict Source route option, a list of router addresses that identify said selected shortest and fastest path;

storing in a forwarding cache a next hop IP address for said destination address; and selectively updating each said selected shortest and fastest path using a time period T_update.

14. A method as in claim 13, including the step wherein said domain provider maintains a list of the shortest and fastest forwarding paths which are configured by each Border Router (Edger Node).

15. A method as in claim 14, including the step wherein a network domain administrator configures a time period for updating includes updating the selected shortest and fastest forwarding paths within a predetermined time period which ranges from 60 to 180 seconds.

16. A method as in claim 15, including the step wherein the network domain administrator chooses the duration of the predetermined time period based on a forwarding cache size in the routers and on types of applications which the network will support.

17. A method as in claim 13, wherein the step of causing the ingress Border Router to insert a list of router addresses comprises using filters configured in the ingress Border Router to obtain a selected shortest and fastest path so as to best match the IP packet destination address.

18. A method as in claim 15, wherein the step of causing the ingress Border Router to insert a list of router addresses is done only for data packets for which there is no information in the forwarding cache for said predetermined time period.

19. A method as in claim 13, comprising the step wherein a plurality of intermediate routers will store an entry of a next hop in their forwarding cache which entry will be for subsequent data packets.

20. A method as in claim 13, wherein the network comprises a Differentiated Services (Diffserv) domain.

21. A method as in claim 20, wherein the Diffserv domain operates in accordance with static or dynamic routing of IP packets.

22. A method as in claim 13, including using Expedited Forwarding for data traffic.

23. A method of reducing jitter in an Internet Protocol (IP) packet transmission in a Differentiated Service Architecture (Diffserv) network, said Diffserv using a forwarding cache and IP destination addresses for packets, and an on demand or traffic driven route cache population, the network having at least an ingress border router and an egress border router, comprising the steps of:

actuating an IP forwarding optional parameter using a strict source route option;

receiving a packet which has a specified IP destination address;

checking the forwarding cache if an entry is available for the IP destination address;

if affirmative, sending a received packet to a next hop specified by the forwarding cache entry;

if mere is no entry in the forwarding cache, then, checking if a route table entry exists for the specified destination address;

if there is a route table entry, then, storing the route table entry into the forwarding cache, and sending the packet on its way;

if there is no forwarding cache entry for the IP destination address, then selecting and extracting using filters the shortest and fastest path to an egress border router;

inserting in the source route option a list of the router addresses that identify the selected path;

storing in the forwarding cache a next hop IP address for the IP destination address;

sending the received packet via the selected path; and handling following subsequent packets which follow the received packet and are bound to the same destination address by routing them to follow the received packet with the strict source route option turned off.

24. A method as in claim 23 wherein the Diffserv network includes intermediate routers which receive a further packet with the strict route option, the method including the step of forwarding the further packet to a first router address in the strict source route option list which is the next hop for said further packet.

25. A method of reducing jitter in an Internet Protocol (IP) transmission in a Differentiated Service Architecture (Diffserv) network which handles information packets with expedited forwarding (EF), said network using a forwarding cache, a strict source route option, at least one ingress border router and one egress border router, and a Diffserv domain provider, said method comprising the steps of:

a. recognizing EF packets which have firm jitter requirements;

b. storing and maintaining in the ingress border router using the Diffserv domain provider a list of the shortest and fastest forwarding paths from the ingress border router to each egress border router;

c. ascertaining if a received EF packet has no entry for its IP destination address;

d. and if affirmative, extracting by using special filters configured in the ingress border router, path-information regarding a selected path representing the shortest and fastest path to an egress border router that best matches the IP destination address of the EF packet;

e. inserting in the strict source route option, a list of router addresses which identify the selected path in step (d);

f. storing in said forwarding cache a next hop IP address for the particular IP destination address; and g. forwarding subsequent IP packets subsequent to said EF packets to said next hop IP address.

26. A method as in claim 25 including defining a time period T_update which is used for updating the selected path of step (d) in claim 25.

27. A method as in 25 including the step of updating steps (e), (f), and (g) with respect to time.

28. A method as in claim 26 wherein T_update is approximately 60 seconds.

29. A method as in claim 28 wherein T_update is used in a Voice Over IP (VoIP) application.

30. A method as in claim 25 wherein T_update is used in a Public Switched Telephony network (PSTN).

31. A method as in claim 30 wherein T_update is in the range of 120 to 180 seconds.

32. A method as in claim 26 including the step of setting up activation of the time period T_update at start up time of an ingress border router.

33. A method as in claim 25, which includes handling subsequent information packets subsequent to recognized packets, the method including routing said subsequent packets as normal Diffserv packets in the same path as a first EF packet, without activating the strict route source option.

34. A computer-readable memory encoded with a computer program for reducing jitter in an Internet Protocol (IP)

packet transmission in a Differentiated Service Architecture (Diffserv) network with assured packet forwarding, said Diffserv using a forwarding cache and IP destination addresses for packets, and an on demand or traffic driven route cache population, the network having at least an ingress Border Router and an egress Border Router, said program using an algorithm, comprising the steps of:

actuating an IP forwarding optional parameter using a source route option;

receiving a packet which has a specified IP destination address;

checking the forwarding cache if an entry is available for the IP destination address;

if affirmative, sending a received packet to a next hop specified by the forwarding cache entry;

if there is no entry in the forwarding cache, then, checking if a route table entry exists for the specified destination address;

if there is a route table entry, then, storing the mute table entry into the forwarding cache, and sending the packet on its way;

if there is no forwarding cache entry for the IP destination address, then selecting and extracting using filters the shortest and fastest path to an egress border router;

inserting in the source route option a list of the router addresses that identify the selected path;

storing in the forwarding cache a next hop IP address for the IP destination address;

sending the received packet via the selected path; and handling following packets which follow the received packet and are bound to the same destination address by routing them to follow the received packet.

35. A computer readable memory encoded with a computer program for reducing jitter in an Internet Protocol (IP) transmission in a Differentiated Service Architecture (Diffserv) network which handles information packets with expedited forwarding (EF), said network using a forwarding cache, a strict source route option, at least one ingress Border Router and one egress Border Router, and a DiffServ domain provider, said program using a method, comprising the steps of:

a. recognizing EF packets which have firm jitter requirements;

b. storing and maintaining in the ingress Border Router using the Diffserv domain provider a list of the shortest and fastest forwarding paths from the ingress border router to each egress Border Router;

c. ascertaining if a received EF packet has no entry for its IP destination address, and if affirmative;

d. extracting using special filters configured in the ingress Border Router path-information regarding a selected path representing the shortest and fastest path to an egress Border Router that best matches the IP destination address of the EF packet;

e. inserting in the strict source route option, a list of router addresses which identify the selected path in step (d);

f. storing in the forwarding cache a next hop IP address for the particular IP destination address; and g. forwarding subsequent IP packets subsequent to said EF packets to said next hop IP address.

36. A Border Router (Edge Node) comprising:

a computer program for limiting jitter in an Internet Protocol (IP) transmission in a Differentiated Service Architecture (Diffserv network which handles information packets with expedited forwarding (EF), said network using a forwarding cache, a strict source route option, at least one ingress border router and one egress border router, and a Diffserv domain provider, said program using a method, comprising the steps of:

a. recognizing EF packets which have firm jitter requirements:

b. storing and maintaining in the ingress Border Router using the DiffServ domain provider, a list of the shortest and fastest forwarding paths from the ingress border router to each egress border router;

c. ascertaining if a received EF packet has no entry for its IP destination d. and if affirmative, extracting using special filters configured in the ingress border router path, information regarding a selected path representing the shortest and fastest path to an egress border router that best matches the IP destination address of the EF packet;

e. inserting in the strict source route option, a list of router addresses which identify the selected path in step (d);

f. storing in the forwarding cache a next hop IP address for the particular IP destination address; and g. forwarding subsequent IP packets subsequent to said EF packets to said next hop IP address.

37. A Core Router (Interior Node) comprising:

a computer program for limiting jitter in an Internet Protocol (IP) transmission in a Differentiated Service Architecture (Diffserv) network which handles information packets with expedited forwarding (EF), said network using a forwarding cache, a strict source route option, at least one ingress border router and one egress border router, and a Diffserv domain provider, said program using a method, comprising the steps of:

a. recognizing EF packets which have firm jitter requirements;

b. storing and maintaining in the ingress Border Router using the Diffserv domain provider, a list of the shortest and fastest forwarding paths from the ingress border router to each egress border router;

c. ascertaining if a received EF packet has no entry for its IP destination address;

d. and if affirmative, extracting using special filters configured in the ingress border router path, information regarding a selected path representing the shortest and fastest path to an egress border router that best matches the IP destination address of the EF packet;

e. inserting in the strict source route option, a list of router addresses which identify the selected path in step (d);

f. storing in the forwarding cache a next hop IP address for the particular IP destination address; and g. forwarding subsequent IP packets subsequent to said EF packets to said next hop IP address.

* * * * *